(No Model.)
F. P. STEBBINS.
CHURN.
No. 266,219. Patented Oct. 17, 1882.
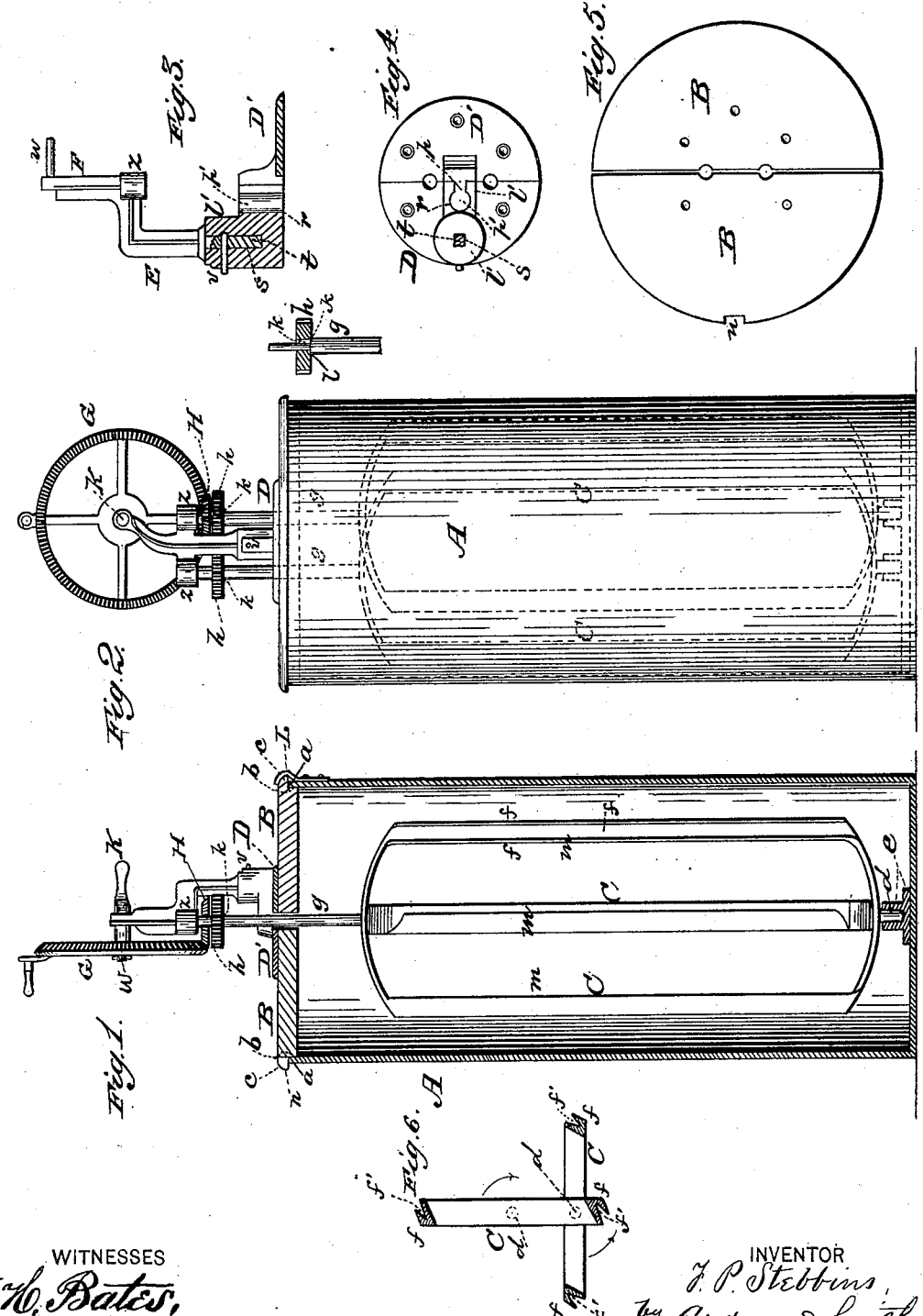
WITNESSES
C. H. Bates,
Philip C. Mass.
INVENTOR
F. P. Stebbins,
by Anderson & Smith
his ATTORNEYS

UNITED STATES PATENT OFFICE.

FRANK P. STEBBINS, OF DETROIT, MICHIGAN.

CHURN.

SPECIFICATION forming part of Letters Patent No. 266,219, dated October 17, 1882.

Application filed May 13, 1882. (No model.)

*To all whom it may concern:*

Be it known that I, FRANK P. STEBBINS, a citizen of the United States, and a resident of Detroit, in the county of Wayne and State of Michigan, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical sectional view of my churn and freezer. Fig. 2 is a side view of the same, and Figs. 3, 4, 5, and 6 are detail views.

This invention has relation to churns and cream-freezers; and it consists in the construction and novel arrangement of the studded catches for the lid-sections, the separable arm or support for the drive-wheel, and its double bearing for the upper ends of the dasher-stems, the plate-sections for the lid-sections, and the socket-and-tongue connection with which they are provided, all as hereinafter set forth.

In the accompanying drawings, the letter A designates the case, which is of ordinary upright form, having a circular area in horizontal section.

B B indicate the cover-sections, each being semicircular and marginally rabbeted at *a* to form a lip, *b*, which fits within the mouth of the case, and a marginal rim-flange, *c*, which projects outward over the edge of the case.

C C represent the dashers, which are made in loop form, being cast of metal. The lower end of each loop-dasher is formed with a supporting-stem, *d*, which works in a pivot-bearing, *e*, at the bottom of the case. The upper end of each loop-dasher is formed with a vertical stem, *g*, which extends upward through a bearing at the joint of the cover-sections, and is provided with a pinion, *h*, as indicated in the drawings. The pinion is secured on the stem by means of a spline, *k*, which is cast on the stem, so that, while it is fast thereto for all purposes of communicating rotary motion, it can be easily and quickly removed. Each stem is cast with a shoulder, *l*, below the spline, on which the pinion rests. The side bars, *m*, of each loop-dasher are cast with oblique longitudinal flanges *f* on their outer edges, these flanges being turned in opposite directions on the side bars, so that the V-form channels *f'*, which lie between the flanges and the side bars, will face or open in opposite directions, as shown. The object of these channels is to aerate the milk or cream as the loops are turned. The stems of these dashers are placed sufficiently close together to allow each loop, in its rotary movement, to intersect the path of the other without interference.

D D' represent the semicircular plate-sections, which are respectively secured to the upper surfaces of the cover-sections at their middle and adjacent portions, so as to form, when closed together, an iron bearing which is concentric with the periphery of the cover. The plate D' is formed with a lug at its edge, carrying a projection, *p*, which extends across the joint of the meeting edges of the two sections, and is enlarged at its outer end, as indicated at *p'*, forming a coupling-tongue to engage a slotted socket-recess, *r*, of corresponding form, which is made in a large lug, *l'*, cast on the top of the other plate-section, D. The lug *l'* is also formed with a square socket, *s*, extending downward into its upper portion, which is designed to receive the squared tang *t* of the double bearing-arm E. A pin, *v*, passing through registering-perforations in the socket *s* and tang *t*, serves to secure the arm in its seat in such a manner that, while it is perfectly secure, it can be easily removed. This arm E is formed with two lateral bearings, *z z*, in which the upper ends or journals of the stems *g* of the dashers are seated, and with an upward and lateral extension, F, carrying a transverse bearing, *w*, for the driving gear-wheel G, which engages a bevel-pinion, H, on the stem *g*, over which the laterally-placed bearing *w* is situated, as indicated in the drawings.

K represents a transverse handle on the extension F, in rear of the bearing *w*, which is designed to enable the operator to steady the machine with one hand while turning the handle of the drive-wheel with the other. This construction is designed to form a strong and compact support for the gearing and dasher-stems, whereby the driving mechanism is maintained in proper position when the cover-sections are in place and duly connected by the tongue and socket of their iron plates, and the arm F is fastened in its seat, and it permits the ready removal of the driving mechanism when the case is to be opened. In this operation the pin $v$ is drawn out of the socket $s$, and the arm E, with the drive-wheel, is lifted from said socket. The pinions can then be removed from the dasher-stems, if necessary.

In order to secure the cover firmly to the case-wall, the latter is provided with the edge-hooks L, which are fastened by studs or rivets to said wall, and, projecting by their heads above the same, serve to engage the rim-flanges $c$ of the cover-sections, one of which is formed with an edge-notch, $n$, to facilitate the engagement.

Having described this invention, what I claim, and desire to secure by Letters Patent, is—

1. The cover-plates D D', having a tongue-and-socket connection, and a separable arm, E, for the drive-wheel, carrying a double bearing for the upper ends of the stems of the dashers, substantially as specified.

2. The cover-sections having the plate-sections D D', connected by tongue $p'$ and socket $r$, and the edge-hooks L of the wall engaging the rim-flanges $c$ of the cover-sections, substantially as specified.

3. The combination, with the dashers C, having the splined and shouldered stems $g$, and their pinions $h$ H and the drive-wheel G, of the cover-sections B, plate-sections D D', their socket-and-tongue connection, the socket $s$, pin $v$, and removable arm E, having the lateral bearings $z$, and the extension F, substantially as specified.

In testimony that I claim the above I have hereunto subscribed my name in the presence of two witnesses.

FRANK PIERCE STEBBINS.

Witnesses:
LOUIS F. GUENTHER,
ADAM E. BLOODE.